UNITED STATES PATENT OFFICE.

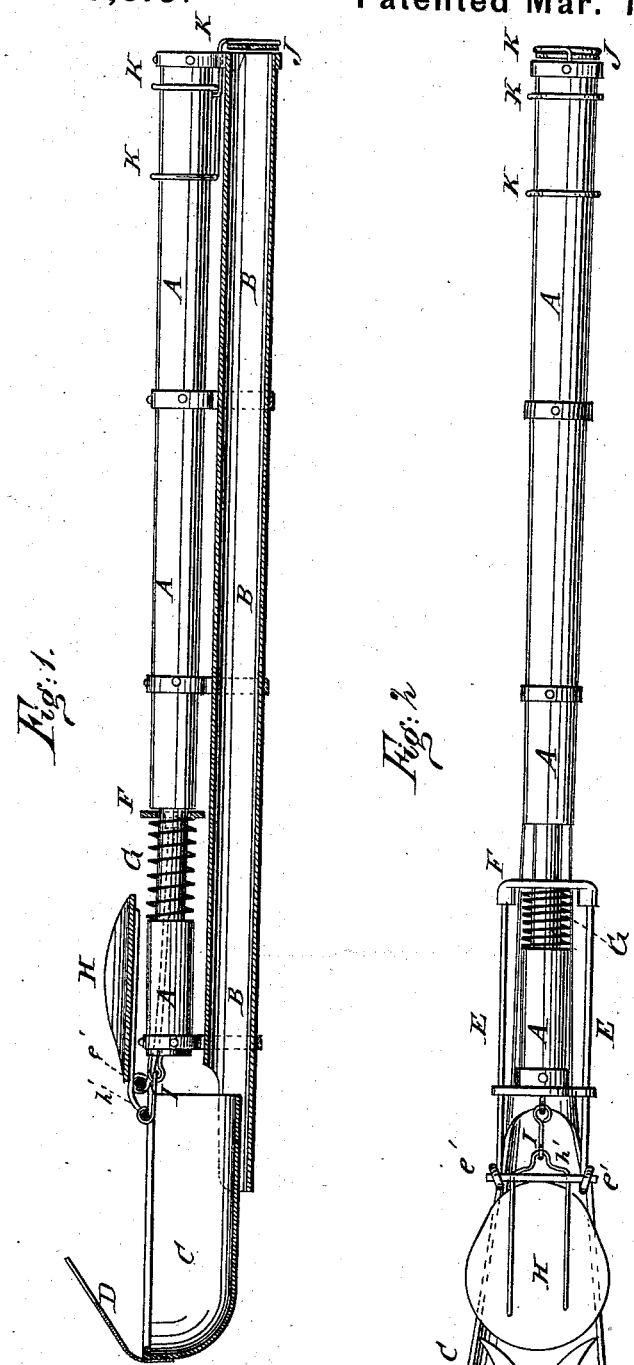

JOHN N. JARMAN, OF PEACHER'S MILLS, TENNESSEE.

FRUIT-GATHERER.

SPECIFICATION forming part of Letters Patent No. 225,610, dated March 16, 1880.

Application filed June 24, 1879.

*To all whom it may concern:*

Be it known that I, JNO. NORTON JARMAN, of Peacher's Mills, in the county of Montgomery and State of Tennessee, have invented a new and useful Improvement in Fruit-Gatherers, of which the following is a specification.

Figure 1 is a side view of my improved fruit-gatherer, partly in section, to show the construction. Fig. 2 is a front view of the same.

Similar letters of reference indicate corresponding parts.

The object of this invention is to furnish an improved implement for gathering apples, pears, peaches, and other fruit from the trees while standing upon the ground, which shall be so constructed as to gather the fruit without bruising it, and which shall be simple in construction and convenient in use.

The invention consists in the combination of the rod, the rubber tube, the elongated cup, the forked hook, the rods, the plate, and the spiral spring with each other; in the combination of the concaved guide-plate and the connecting-rod with the elongated cup, the rods, the plate, the spiral spring, and the rod; and in the combination of the rubber plate and its adjustable supporting-wire with the rubber tube and the rod, as hereinafter fully described.

A represents a long light rod, which is designed to be made in sections, so that it may be lengthened and shortened, as may be required.

B is a rubber tube, of such a size that the fruit to be picked will pass down through it, and which passes down along the rod A, and is connected with it by bands or other suitable connections.

C is an elongated cup, the lower end of which is connected with the upper end of the tube B, so that any fruit in the said cup will roll from it into the said tube B. To the upper end of the cup C is attached a forked hook, D, to cut the fruit from the limbs of the trees. To the opposite sides of the lower end of the cup C are attached two rods, E, which pass down upon the opposite sides of the upper part of the rod A.

The lower ends of the rods E are attached to the opposite ends of a small plate, F, which has a hole through its center, through which the rod A, passes, and against which rests the lower end of the spiral spring G, placed upon the said rod A. The upper end of the spiral spring G rests against a shoulder of the rod A or against a collar or other stop attached to the said rod.

H is a concaved guide-plate, which is hinged, at or near its end, to the rods E by a short cross-rod, e'. To the end of the guide H, or to a short loop, h', attached to the said end, is hinged the end of a short connecting-wire, I, the other end of which is hinged to the upper end of the rod A.

With this construction, when the forked hook D is hooked over the fruit and the rod A is drawn upon to cut off the stem of the said fruit, the strain draws the cup C upward, compressing the spring G. This movement turns the guide-plate H upward, as shown in Fig. 2, so that the said plate H may guide the fruit into the mouth of the tube B, and thus guard against the possibility of its falling.

When the fruit has been cut off the strain is released, and the various parts return to their former position, as shown in Fig. 1, and the implement is ready to be passed over another fruit.

The lower end of the tube B is closed by a rubber plate, J, connected with the lower part of the rod A by a wire, K, so that the said plate may be withdrawn from the lower end of the said tube B when it is desired to allow the fruit to escape from the said tube B.

The wire K should be provided with a spring to hold the rubber plate J against the lower end of the tube B, except when it is desired to discharge the fruit.

Having thus described my invention, I claim as new and desire to secure by Letters Patent—

1. The combination of the rod A, the rubber tube B, the elongated cup C, the forked hook D, the guide-plate H, the rods E, the plate F, and the spiral spring G with each other, substantially as herein shown and described.

2. The guide-plate H, provided with a bail, $h'$, and hinged to the end of the rod A by the link I, in combination with the said rod, the rods E, the plate F, and the spring G, whereby provision is made for turning the said plate upward to guide the fruit into the mouth of the tube by the downward pull on the rod or handle, substantially as described.

3. The wire K, provided with the rubber plate J, and adapted to slide upon the handle A, in combination with the said handle and the rubber tube B, substantially as and for the purpose set forth.

JNO. NORTON JARMAN.

Witnesses:
G. W. McCAULEY,
R. H. POOLE.